United States Patent
Anand et al.

(10) Patent No.: US 10,656,992 B2
(45) Date of Patent: May 19, 2020

(54) APPARATUS AND A METHOD OF DETECTING ERRORS ON REGISTERS

(71) Applicant: CAVIUM, INC., San Jose, CA (US)

(72) Inventors: Vishal Anand, Saratoga, CA (US); Harish Krishnamoorthy, San Jose, CA (US); Guy Hutchison, Santa Clara, CA (US)

(73) Assignee: Cavium International, Grand Cayman (KY)

( * ) Notice: Subject to any disclaimer, the term of this patent is extended or adjusted under 35 U.S.C. 154(b) by 446 days.

(21) Appl. No.: 14/521,333

(22) Filed: Oct. 22, 2014

(65) Prior Publication Data

US 2016/0117217 A1     Apr. 28, 2016

(51) Int. Cl.
*G06F 11/10* (2006.01)
*G06F 11/24* (2006.01)

(52) U.S. Cl.
CPC ................... *G06F 11/1004* (2013.01)

(58) Field of Classification Search
CPC ............ G06F 11/1004; G06F 11/1008; G06F 11/1032; G06F 11/1402; G06F 11/10; G06F 11/1076; H04L 1/0057
See application file for complete search history.

(56) References Cited

U.S. PATENT DOCUMENTS

| | | | |
|---|---|---|---|
| 4,617,648 A * | 10/1986 | Kuboki | G06F 11/2236 365/154 |
| 5,613,071 A * | 3/1997 | Rankin | G06F 12/0284 |
| 5,625,276 A * | 4/1997 | Scott | B23K 9/1062 310/114 |
| 5,640,509 A * | 6/1997 | Balmer | G11C 29/50 365/201 |
| 5,959,914 A * | 9/1999 | Gates | G06F 11/1048 365/201 |
| 6,076,146 A | 6/2000 | Tran | |
| 6,216,193 B1 | 4/2001 | Lai et al. | |
| 6,247,089 B1 | 6/2001 | Kuo et al. | |
| 6,330,688 B1 * | 12/2001 | Brown | G11C 29/82 365/200 |
| 6,678,837 B1 * | 1/2004 | Quach | G06F 11/1004 712/244 |
| 6,831,917 B1 | 12/2004 | Cheriton | |
| 7,596,744 B1 * | 9/2009 | Kow | G06F 11/1004 714/819 |
| 8,054,744 B1 | 11/2011 | Bishara et al. | |
| 8,437,200 B1 * | 5/2013 | Tan | H03K 19/17764 365/189.07 |

(Continued)

OTHER PUBLICATIONS

Musin etal,, Multiple Errors Detection Technique for RAM, IEEE, Conference Paper, Pertinent pp. 1-4. (Year: 2007).*

*Primary Examiner* — April Y Blair
*Assistant Examiner* — Dipakkumar B Gandhi

(57) ABSTRACT

An error detection circuit on a semiconductor chip detects whether soft errors have affected flip-flop implemented registers on the semiconductor chip. A signature of these flip-flop implemented registers on the semiconductor chip is periodically captured. The signature allows for the integrity of the flip-flop implemented registers to be constantly monitored. A soft error occurring on any of the flip-flop implemented registers can be immediately detected. In response to the detection, an interrupt is raised to notify software to take action.

32 Claims, 2 Drawing Sheets

(56) References Cited

U.S. PATENT DOCUMENTS

| | | | |
|---|---|---|---|
| 2003/0190078 A1* | 10/2003 | Govindaswamy | H04N 19/89 382/232 |
| 2005/0076228 A1 | 4/2005 | Davis | |
| 2005/0138478 A1* | 6/2005 | Safford | G06F 11/1497 714/38.1 |
| 2007/0011537 A1* | 1/2007 | Kiryu | G01R 31/318547 714/733 |
| 2007/0101043 A1* | 5/2007 | Herman | G06F 13/4004 710/315 |
| 2007/0168814 A1* | 7/2007 | Leininger | G01R 31/31922 714/738 |
| 2007/0180006 A1* | 8/2007 | Gyoten | G06F 13/1652 708/200 |
| 2007/0186085 A1* | 8/2007 | Yim | H03K 19/177 712/244 |
| 2008/0136829 A1 | 6/2008 | Su | |
| 2009/0198876 A1 | 8/2009 | Lai et al. | |
| 2009/0328211 A1* | 12/2009 | Abraham | G06F 21/54 726/22 |
| 2010/0107249 A1* | 4/2010 | Krig | G06F 21/57 726/22 |
| 2011/0295815 A1* | 12/2011 | Mandagere | G06F 11/1004 707/690 |
| 2012/0192035 A1* | 7/2012 | Nakanishi | G06F 11/1048 714/766 |
| 2013/0055033 A1* | 2/2013 | Frazier | G06F 11/348 714/45 |
| 2013/0111308 A1* | 5/2013 | Sauber | G06F 11/1004 714/807 |
| 2013/0163475 A1 | 6/2013 | Beliveau | |
| 2013/0191701 A1* | 7/2013 | Mueller | G06F 11/1048 714/764 |
| 2014/0153443 A1 | 6/2014 | Carter | |
| 2016/0077904 A1* | 3/2016 | Wendel | G06F 11/079 714/819 |

* cited by examiner

APPARATUS AND A METHOD OF DETECTING ERRORS ON REGISTERS

FIELD OF INVENTION

The present invention relates to semiconductor memory devices. More particularly, the present invention relates to an apparatus and a method of detecting errors on registers on a semiconductor chip.

BACKGROUND OF THE INVENTION

ASICs (application specific integrated circuits) are becoming more and more complex with multi-million gates. Due to low power requirements, chips are reduced in size, making it prone to soft errors due to interface from alpha particles or neutrons emitted by packaging materials and cosmic rays. Soft errors are glitches in devices and occur when a logic state from "1" as initially written to "0" or vice versa. Soft errors cause no permanent damage. However, soft errors can limit the reliability of hardware devices.

The technology trend has been to go towards even more reduced geometry (20 nm, 14 nm, etc., integrated circuits), which makes soft error problems worse. Conventionally, memories on chip have used techniques such as ECC (error correction code), CRC (cyclic redundancy check) and LDPC (low density parity check) to detect and recover from such errors. However, apart from memories, ASICs contain a large amount of programming state in flip-flops. This state, in control registers, is programmed initially by software and controls how devices operate. Unlike pipelines and dynamic content, this state rarely changes and stays static, which makes this state even more vulnerable to soft errors as once soft error occurs, no corrective actions can be taken. Soft errors are extremely dangerous as they can alter the way a device is operating.

BRIEF SUMMARY OF THE INVENTION

An error detection circuit on a semiconductor chip detects whether soft errors have affected flip-flop implemented registers on the semiconductor chip. A signature of these flip-flop implemented registers on the semiconductor chip is periodically captured. The signature allows for the integrity of the flip-flop implemented registers to be constantly monitored. A soft error occurring on any of the flip-flop implemented registers can be immediately detected. In response to the detection, an interrupt is raised to notify software to take action.

In one aspect, a semiconductor chip is provided. The semiconductor chip includes a plurality of control registers implemented as flip-flops, wherein each in the plurality of control registers stores control data, and an initial signature captured across all of the control registers.

The semiconductor chip also includes an error detection circuit configured to receive output signals from the plurality of control registers, periodically calculate a subsequent signature based on values of the received output signals, compare the subsequent signature with the initial signature, and based on the comparison, raise an interrupt.

In some embodiments, the semiconductor chip also includes a global register, wherein the initial signature is stored in the global register. Alternatively, the initial signature is stored in a field.

In some embodiments, the initial signature and the subsequent are calculated according to an error detection algorithm. The error detection algorithm is CRC scheme, a party bit scheme, a checksum scheme. Other error detection algorithms are contemplated.

In some embodiments, the plurality of control registers is associated with a slave stage. Alternatively, the plurality of control registers is associated with a master stage. Alternatively, a first portion of the plurality of control registers is associated with the slave stage, and a second portion of the plurality of control registers is associated with the master stage.

In another aspect, a system for detecting a soft error in a semiconductor chip is provided. The system includes memory storing an error detection algorithm, a plurality of flip-flop implemented registers, wherein each in the plurality of flip-flop implemented registers is preprogrammed to store substantially static data, and an initial signature captured across all of the flip-flop implemented registers, wherein the initial signature is calculated based on the error detection algorithm. The system also includes an error detection circuit configured to periodically calculate a subsequent signature according to the error detection algorithm, compare the subsequent signature with the initial signature, and based on the comparison, raise an interrupt.

In some embodiments, the substantially static data includes control data. In some embodiments, the substantially static data includes configuration data.

In some embodiments, the initial signature is stored in the memory.

In some embodiments, the plurality of flip-flop implemented registers is associated with a slave stage. Alternatively, the plurality of flip-flop implemented registers is associated with a master stage. Alternatively, a first portion of the plurality of flip-flop implemented registers is associated with the slave stage, and a second portion of the plurality of flip-flop implemented registers is associated with a master stage.

In some embodiments, the system further includes a global register, wherein the initial signature is stored in the global register.

In some embodiments, the system further includes a register that is a concatenation of the plurality of flip-flop implemented registers.

In some embodiments, the system further includes a protection bit such that enabling the protection bit activates the error detection circuit.

In some embodiments, the system further includes a check bit such that enabling the check bit activates a check feature of the error detection circuit, wherein when the check feature is enabled, the error detection circuit checks the subsequent signature against the initial signature.

In yet another aspect, a method of detecting a software error is provided. The method includes maintaining an initial signature captured across all flip-flop implemented registers of a semiconductor chip, periodically calculating, by an error detection circuit, a subsequent signature across all of the flip-flop implemented registers, comparing, by the error detection circuit, the subsequent signature with the initial signature, and raising, by the error detection circuit, an interrupt when the subsequent signature does not match the initial signature.

In some embodiments, the method further includes initializing all of the flip-flop implemented registers, and calculating the initial signature.

In some embodiments, the initial signature is stored in software. Alternatively, the initial signature is stored in hardware.

In some embodiments, the method further includes deactivating the error detection circuit via software prior to initializing all of the flip-flop implemented registers, and activating the error detection circuit via software after calculating the initial signature.

In some embodiments, the method further includes enabling a check feature of the error detection circuit via software prior to the comparison step.

In some embodiments, the method further includes, in response to the interrupt, suspending operation of the semiconductor chip until one or more of the flip-flop implemented registers are reprogrammed.

In some embodiments, the flip-flop implemented registers are control registers. In some embodiments, the flip-flop implemented registers are configuration registers. In some embodiments, the flip-flop implemented registers store substantially constant data.

In some embodiments, the plurality of flip-flop implemented registers is associated with a slave stage. Alternatively, the plurality of flip-flop implemented registers is associated with a master stage. Alternatively, a first portion of the plurality of flip-flop implemented registers is associated with the slave stage, and a second portion of the plurality of flip-flop implemented registers is associated with a master stage.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
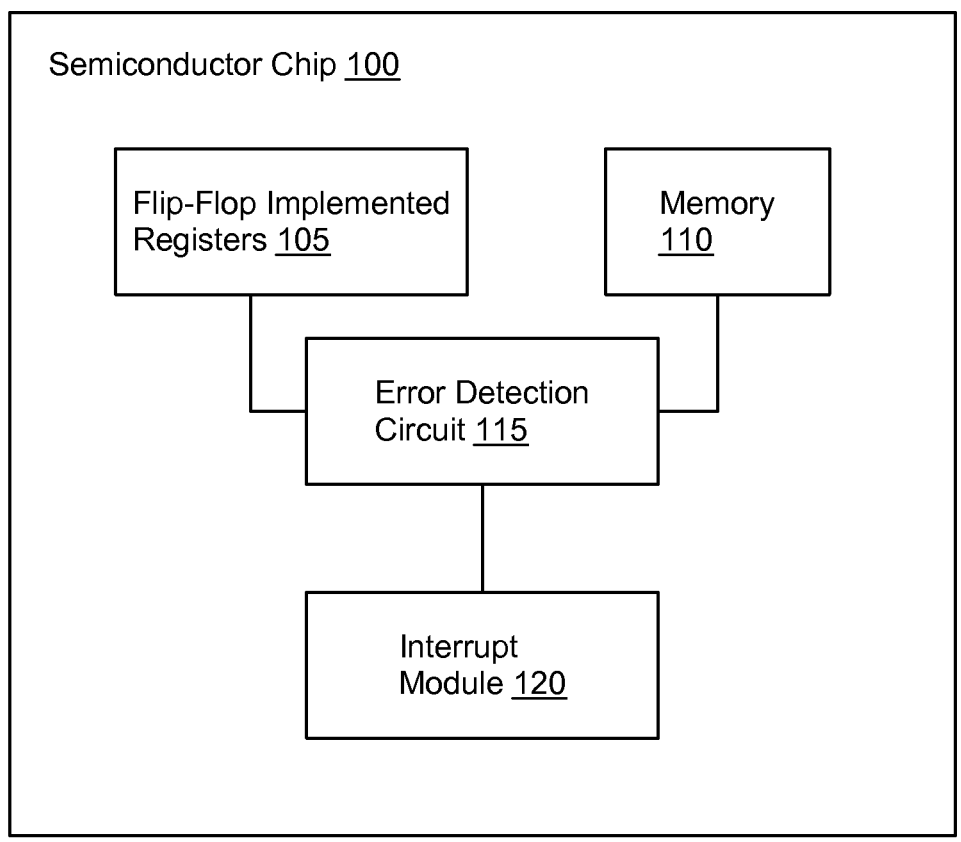
FIG. 1 illustrates a block diagram of an exemplary semiconductor chip in accordance with some embodiments.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

An error detection circuit on a semiconductor chip detects whether soft errors have affected flip-flop implemented registers on the semiconductor chip. A signature of these flip-flop implemented registers on the semiconductor chip is periodically captured. The signature allows for the integrity of the flip-flop implemented registers to be constantly monitored. A soft error occurring on any of the flip-flop implemented registers can be immediately detected. In response to the detection, an interrupt is raised to notify software to take action.

In some embodiments, the error detection circuit can be enabled or disabled via a protection bit. The protection bit can be set via software. The error detection circuit is first disabled to allow the flip-flop implemented registers to be preprogrammed with substantially static or constant data. For example, the flip-flop implemented registers can be control registers initialized with control data. For another example, the flip-flop implemented registers can also be configuration registers initialized with configuration data. The flip-flop implemented registers are associated with a slave stage. Alternatively, the flip-flop implemented registers are associated with a master stage. Alternatively, a first portion of the flip-flop implemented registers is associated with the slave stage, and a second portion of the flip-flop implemented registers is associated with the master stage. An initial signature is calculated across all of the flip-flop implemented registers after the flip-flop implemented registers are initialized. The initial signature can be stored in a global register. Alternatively, the initial signature can be stored in a field. The error detection circuit is then enabled. When the error detection circuit is enabled, the error detection circuit starts to receive output signals from the flip-flop implemented registers and periodically calculates a subsequent signature based on values of the received output signals.

In some embodiments, a check feature of the error detection circuit can be enabled or disabled via a check bit. The check bit can be set via software. When the check feature is enabled, the error detection circuit checks a subsequent signature against the initial signature. When the subsequent signature is different from the initial signature, the error detection circuit raises or causes an interrupt to notify software to take action. An exemplary action is to reprogram one or more of the flip-flop implemented registers. In some embodiments, normal operation of the semiconductor chip is suspended until the reprogramming of the one or more of the flip-flop implemented registers is completed.

In some embodiments, the initial signature and the subsequent signatures are calculated based on an error detection and/or correction algorithm such as a checksum scheme, a parity bit scheme, an ECC (error correction code) scheme, a CRC (cyclic redundancy check) scheme or a LDPC (low density parity check) scheme. Other error detection and/or correction algorithms are contemplated. The error detection and/or correction algorithm is typically stored in memory of the semiconductor chip.

FIG. 1 illustrates a block diagram of an exemplary semiconductor chip 100 in accordance with some embodiments. The semiconductor chip 100 includes flip-flop implemented registers 105, memory 110, an error detection circuit 115, and an interrupt module 120. The error detection circuit 115 is coupled with the flip-flop implemented registers 105, the memory 110 and the interrupt module 120. The flip-flop implemented registers 105 are preprogrammed and store substantially constant data such as control data or configuration data. The memory 110 stores an error detection and/or correction algorithm, which is used to calculate an initial signature and subsequent signatures. In some embodiments, the initial signature is stored in software. In some embodiments, the initial signature is stored in hardware. The error detection circuit 115, when enabled, receive output signals from the flip-flop implemented registers and periodically calculates a subsequent signature according to the error detection and/or correction algorithm, using values of the received output signals. When the subsequent signature is different from the initial signature, the error detection circuit raises or causes an interrupt to notify software to take action.

In a hypothetical, assume Cfg1, Cfg2 and Cfg3 are configuration registers and CfgALL is a register that is a concatenation of Cfg1, Cfg2 and Cfg3 (i.e., CfgALL={Cfg1, Cfg2, Cfg3}). CfgCRC is the computed CRC value using some specific polynomial across the CfgALL (e.g., CfgCRC=CRC(CfgALL)). The CfgCRC is an initial signature, which can be stored in stored in a field or in a global register. When a subsequently calculated CRC(CfgALL) is different from the initial CfgCRC, an interrupt is raised.

Figure 2:
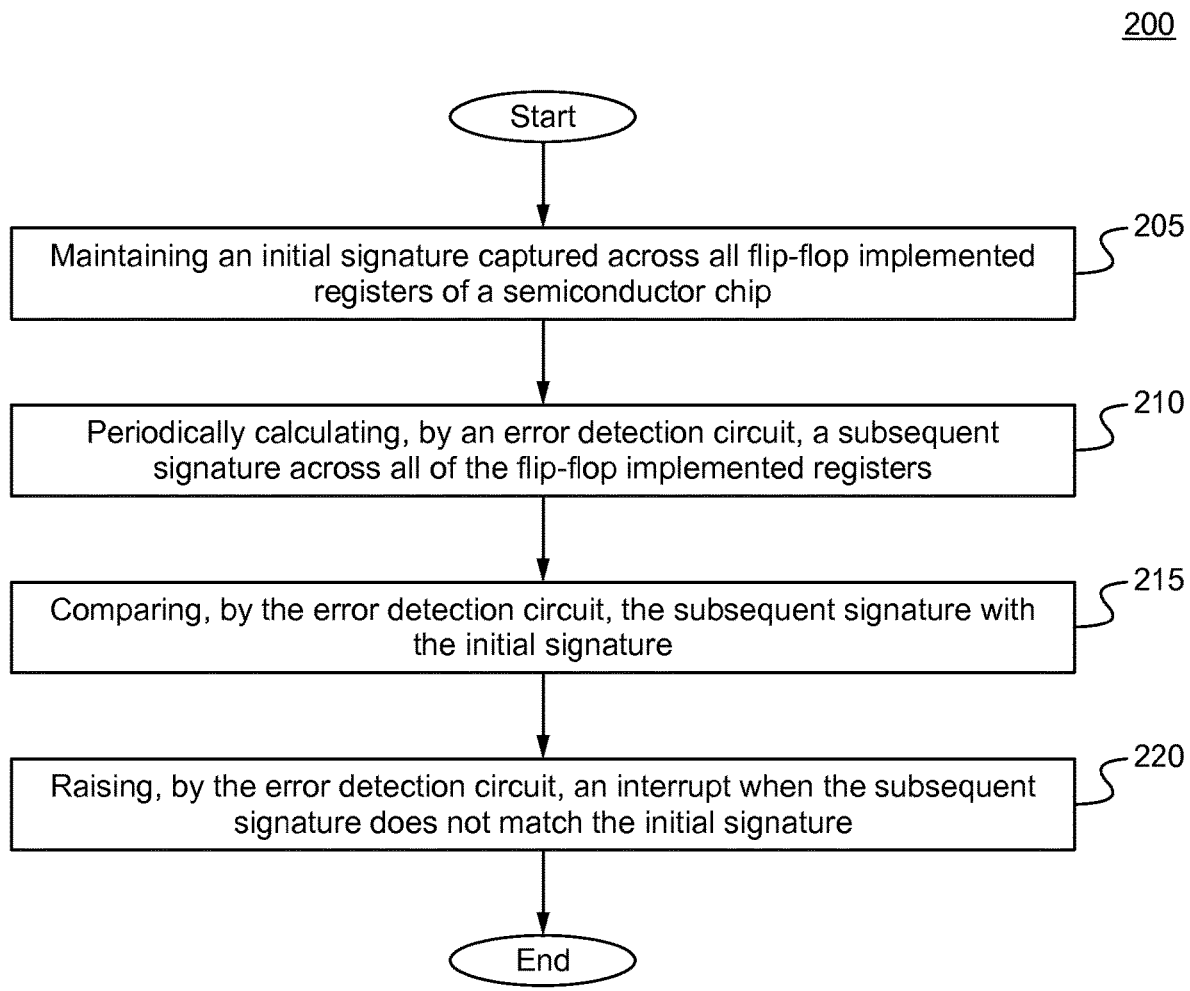
FIG. 2 illustrates an exemplary method of detecting a software error in accordance with some embodiments.

FIG. 2 illustrates an exemplary method 200 of detecting a software error in accordance with some embodiments. In some embodiments, prior to the method 200, an error detection circuit is deactivated by disabling a protection bit via software. Flip-flop implemented registers on a semiconductor chip are initialized and an initial signature across all of the flip-flop implemented registers is calculated. The error detection circuit is thereafter activated by enabling the protection bit via software.

At a step 205, the initial signature captured across all of the flip-flop implemented registers of the semiconductor chip maintained. The initial signature can be maintained in a software field. Alternatively, the initial signature can be maintained in a global register in hardware.

At a step 210, the error detection circuit periodically calculates a subsequent signature across all of the flip-flop implemented registers in the semiconductor chip.

At a step 215, the error detection circuit compares the subsequent signature with the initial signature. In some embodiments, a check feature of the error detection circuit is enabled via software prior to the step 215.

At a step 220, the error detection circuit raises an interrupt when the subsequent signature does not match the initial signature. In some embodiments, in response to the interrupt, operation of the semiconductor chip is suspended until one or more of the flip-flop implemented registers are reprogrammed.

The signature of the flip-flop implemented registers on the semiconductor chip that is periodically captured allows for the integrity of the flip-flop implemented registers to be constantly monitored. Detection of an occurrence of error on the flip-flop implemented registers is automated. If an error is detected, an interrupt is raised which will assist software to reprogram the one or more flip-flop implemented registers. This implementation is low cost since only one signature is maintained across all flip-flop implemented registers on the semiconductor chip.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A semiconductor chip, comprising:
a plurality of control registers implemented as flip-flops, wherein each of the plurality of control registers stores control data;
a concatenation register that stores a concatenation of the control data of the plurality of control registers; and
an error detection circuit configured to:
use the concatenation of the control data to calculate an initial signature that represents the control data of all of the plurality of control registers together;
monitor both a protection bit value and a check bit value;
receive output signals from the plurality of control registers;
periodically calculate a subsequent signature based on a subsequent concatenation of values of the received output signals when the protection bit value indicates that the error detection circuit is enabled;
determine whether to compare the subsequent signature with the initial signature based on both the protection bit value and the check bit value;
compare the subsequent signature with the initial signature when both the protection bit value indicates that the error detection circuit is enabled and the check bit value indicates that checking is enabled;
raise an interrupt when the subsequent signature does not match the initial signature; and
in response to the interrupt:
suspend operation of the semiconductor chip;
reprogram the plurality of control registers, wherein the reprogramming includes replacing error values that caused the subsequent signature to not match the initial signature with non-error values; and
resume operation of the semiconductor chip.

2. The semiconductor chip of claim 1, further comprising a global register, wherein the initial signature is stored in the global register.

3. The semiconductor chip of claim 1, wherein the initial signature is stored in a field.

4. The semiconductor chip of claim 1, wherein the initial signature and the subsequent signature are calculated according to an error detection algorithm.

5. The semiconductor chip of claim 4, wherein the error detection algorithm is a cyclic redundancy check (CRC) scheme.

6. The semiconductor chip of claim 4, wherein the error detection algorithm is a parity bit scheme.

7. The semiconductor chip of claim 4, wherein the error detection algorithm is a checksum scheme.

8. The semiconductor chip of claim 1, wherein the plurality of control registers is associated with a slave stage.

9. The semiconductor chip of claim 1, wherein the plurality of control registers is associated with a master stage.

10. The semiconductor chip of claim 1, wherein a first portion of the plurality of control registers is associated with a slave stage and a second portion of the plurality of control registers is associated with a master stage.

11. The semiconductor chip of claim 1, wherein the error detection circuit is configured to receive the output signals from the plurality of control registers when the protection bit value indicates that the error detection circuit is enabled.

12. A system for detecting a soft error in a semiconductor chip, the system comprising: memory storing an error detection algorithm; a plurality of flip-flop implemented registers, wherein each of the plurality of flip-flop implemented registers is preprogrammed to store static data; a concatenation register that stores a concatenation of the static data of the plurality of flip-flop implemented registers;

and an error detection circuit configured to: use the concatenation of the static data to calculate an initial signature that represents control data of plurality of control registers together, wherein the initial signature is calculated based on the error detection algorithm; monitor both a protection bit value and a check bit value; periodically calculate a subsequent signature according to the error detection algorithm based on a subsequent concatenation of values of output signals received from the plurality of flip-flop implemented registers; determine whether to compare the subsequent signature with the initial signature based on both the protection bit value and the check bit value; compare the subsequent signature with the initial signature when both the protection bit value indicates that the error detection circuit is enabled and the check bit value indicates that checking is enabled; raise an interrupt when the subsequent signature does not match the initial signature; and in response to the interrupt: suspend operation of the semiconductor chip; reprogram the plurality of flip-flop implemented registers, wherein the reprogramming includes replacing error values that caused the subsequent signature to not match the initial signature with non-error values; and resume operation of the semiconductor chip.

13. The system of claim 12, wherein the static data includes control data.

14. The system of claim 12, wherein the static data includes configuration data.

15. The system of claim 12, wherein the initial signature is stored in the memory.

16. The system of claim 12, wherein the plurality of flip-flop implemented registers is associated with a slave stage.

17. The system of claim 12, wherein the plurality of flip-flop implemented registers is associated with a master stage.

18. The system of claim 12, wherein a first portion of the plurality of flip-flop implemented registers is associated with a slave stage and a second portion of the plurality of flip-flop implemented registers is associated with a master stage.

19. The system of claim 12, further comprising a global register, wherein the initial signature is stored in the global register.

20. The system of claim 12, wherein the error detection circuit is configured to periodically calculate the subsequent signature according to the error detection algorithm when the protection bit value indicates that the error detection circuit is enabled.

21. A method of detecting a software error, the method comprising:
monitoring both a protection bit value and a check bit value;
maintaining a concatenation register that stores a concatenation of control data of a plurality of flip-flop implemented registers of a semiconductor chip;
use the concatenation of the control data to calculate an initial signature that represents the control data of all of the plurality of flip-flop implemented registers together;
periodically calculating, by an error detection circuit, a subsequent signature based on a subsequent concatenation of values of output signals received from the plurality of flip-flop implemented registers when the protection bit value indicates that the error detection circuit is enabled;
determining whether to compare the subsequent signature with the initial signature based on both the protection bit value and the check bit value;
comparing, by the error detection circuit, the subsequent signature with the initial signature when both the protection bit value indicates that the error detection circuit is enabled and the check bit value indicates that checking is enabled;
raising, by the error detection circuit, an interrupt when the subsequent signature does not match the initial signature; and
in response to the interrupt:
suspending operation of the semiconductor chip;
reprogram the plurality of flip-flop implemented registers, wherein the reprogramming includes replacing error values that caused the subsequent signature to not match the initial signature with non-error values; and
resuming operation of the semiconductor chip.

22. The method of claim 21, further comprising:
initializing the flip-flop implemented registers; and
calculating the initial signature.

23. The method of claim 21, wherein the initial signature is stored in software.

24. The method of claim 21, wherein the initial signature is stored in hardware.

25. The method of claim 21, further comprising:
deactivating the error detection circuit via software prior to initializing the flip-flop implemented registers; and
activating the error detection circuit via software after calculating the initial signature.

26. The method of claim 21, wherein the flip-flop implemented registers are control registers.

27. The method of claim 21, wherein the flip-flop implemented registers are configuration registers.

28. The method of claim 21, wherein the flip-flop implemented registers store constant data.

29. The method of claim 21, wherein the plurality of flip-flop implemented registers is associated with a slave stage.

30. The method of claim 21, wherein the plurality of flip-flop implemented registers is associated with a master stage.

31. The method of claim 21, wherein a first portion of the plurality of flip-flop implemented registers is associated with a slave stage and a second portion of the plurality of flip-flop implemented registers is associated with a master stage.

32. The method of claim 21, wherein maintaining of the initial signature captured across the plurality of flip-flop implemented registers of the semiconductor chip occurs when the protection bit value indicates that the error detection circuit is enabled.

* * * * *